March 31, 1931.  C. B. HALL  1,798,793
CINEMATOGRAPHIC APPARATUS
Filed June 8, 1928  3 Sheets-Sheet 1

Inventor
Clarence B. Hall
by Roberts, Cushman & Woodberry
Attys.

March 31, 1931.     C. B. HALL     1,798,793
CINEMATOGRAPHIC APPARATUS
Filed June 8, 1928     3 Sheets-Sheet 2
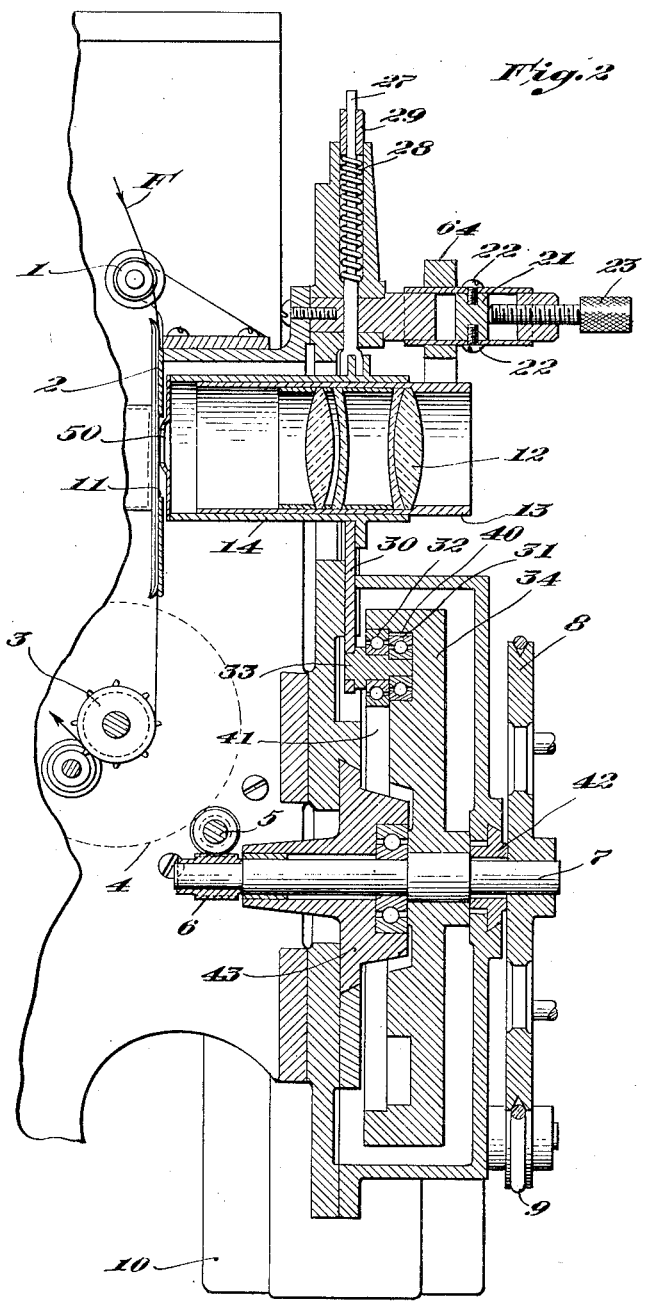

March 31, 1931.                C. B. HALL                1,798,793
CINEMATOGRAPHIC APPARATUS
Filed June 8, 1928          3 Sheets-Sheet 3
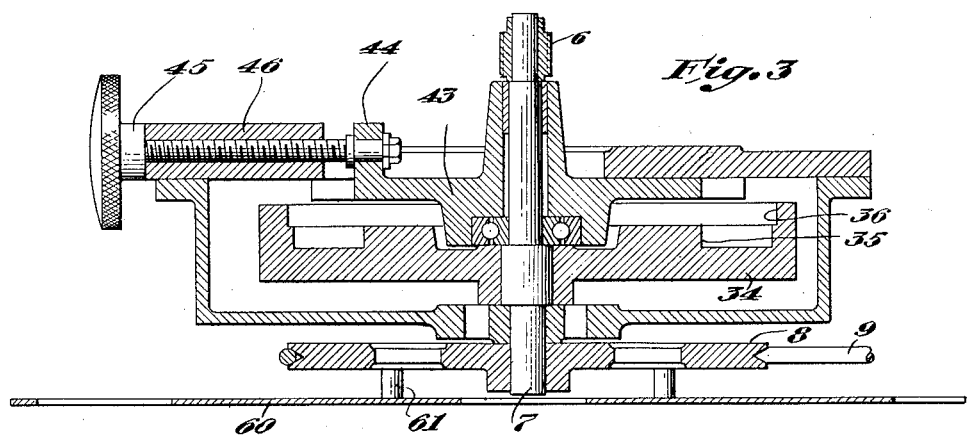
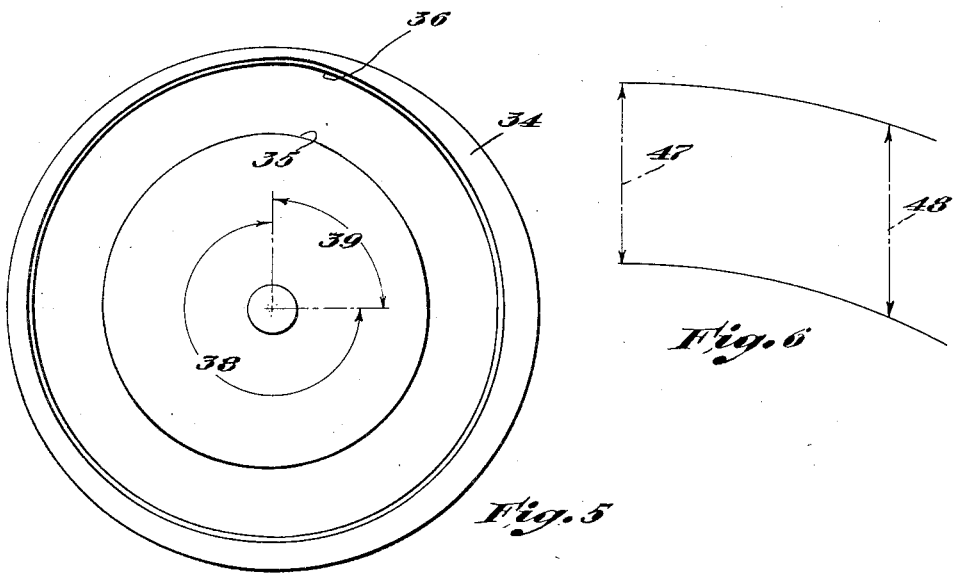
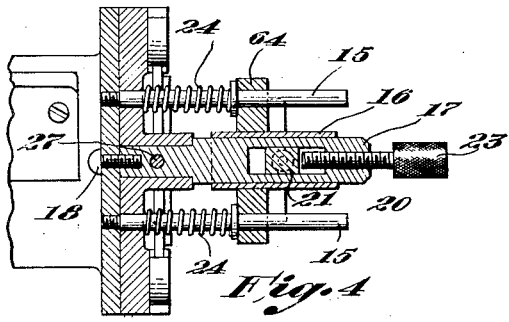
Inventor
Clarence B. Hall
by Roberts Cushman & Woodberry
Attys.

Patented Mar. 31, 1931

1,798,793

UNITED STATES PATENT OFFICE

CLARENCE B. HALL, OF BOSTON (DORCHESTER), MASSACHUSETTS, ASSIGNOR TO LORENZ F. MUTHER, OF NEWTON, MASSACHUSETTS

CINEMATOGRAPHIC APPARATUS

Application filed June 8, 1928. Serial No. 283,763.

In the art of cinematography the practice of advancing the film intermittently has given rise to many difficulties such as wear and tear on the film due to sudden pulls at the sprocket holes, unsteadiness of the projected picture due to wear of the intermittent mechanism for advancing and registering the film, objectionable noise of the intermittently acting mechanism, and inability to record sound continuously on the same film with concomitant pictures. Objects of the present invention are to overcome these difficulties and at the same time to facilitate adjustments for different focal lengths and different degrees of film shrinkage and generally to improve the smoothness of operation and the like of cinematographic machines.

According to this invention the film is fed continuously instead of intermittently as in the ordinary cinematographic machine, and the lens or optical system is reciprocated or otherwise moved back and forth along a path transverse of the optical axis and parallel to the path of that portion of the film being exposed, printed or projected. The lens is actuated by a rotary cam or other rotary actuator turning on an axis transverse to the path of the lens and means are provided to adjust the actuator transversely of both said path and actuator, thereby to adjust the throw of the lens. The rotary actuator is kinematically connected to the lens to permit said adjustment while the mechanism is operating, thereby facilitating the adjustment and avoiding the necessity of stopping the machine for this purpose.

For the purpose of illustration I have shown one concrete embodiment of the invention in the accompanying drawings, in which Fig. 1 is a front elevation with parts broken away;

Fig. 2 is a vertical central section on line 2—2 of Fig. 1;

Fig. 3 is a transverse section on line 3—3 of Fig. 1;

Fig. 4 is a transverse section on line 4—4 of Fig. 1;

Fig. 5 is a face view of the lens-actuating cam; and

Fig. 6 is a diagram showing how the adjustment of the cam transversely of the axis varies the throw of the reciprocating lens.

Figure 1:
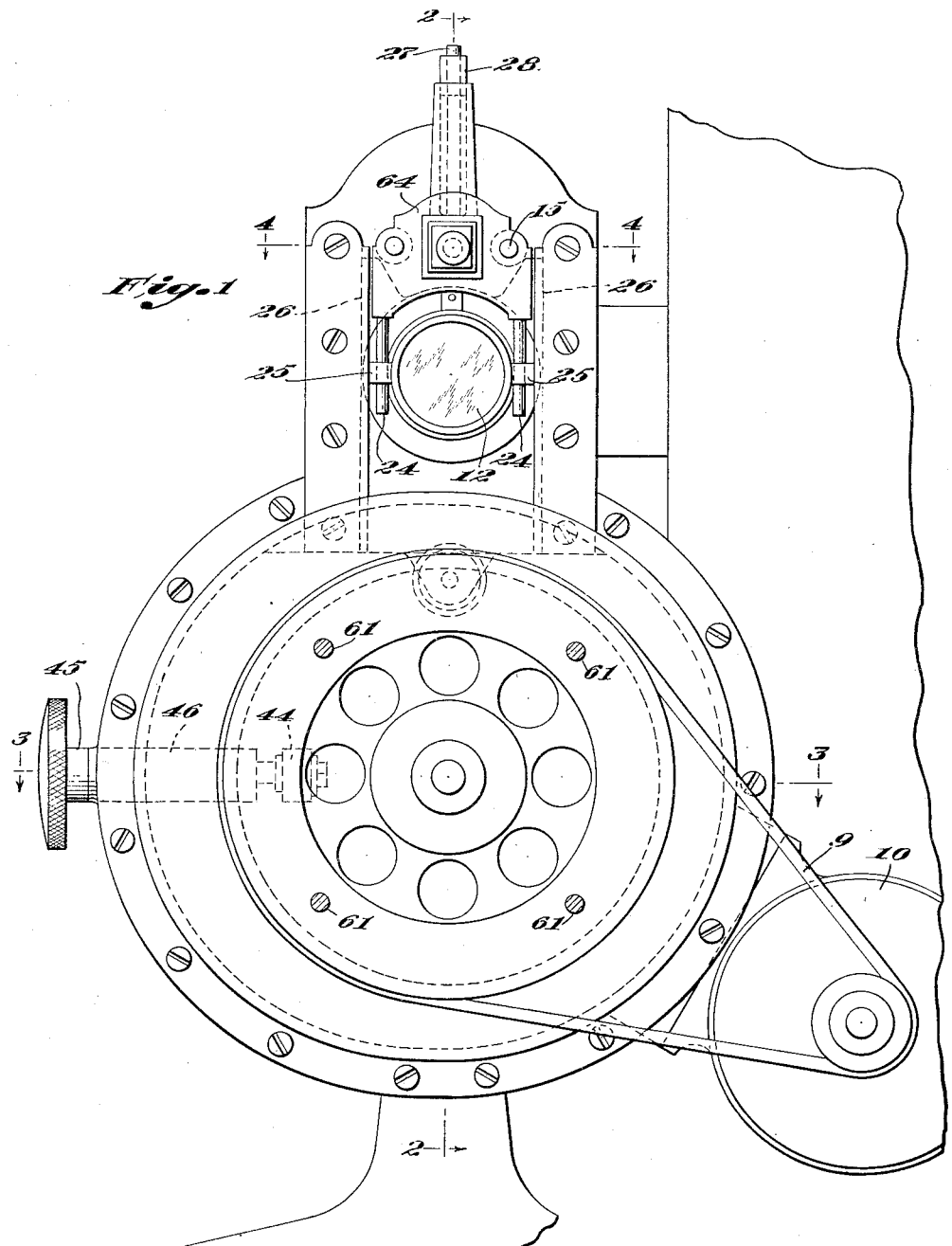

In the particular embodiment of the invention chosen for the purpose of illustration the film F feeds over the idler roll 1 through the film gate 2, being driven by a sprocket wheel 3 rotated continuously through gears 4, 5, 6, shaft 7, pulley 8, belt 9 and motor 10. In the case of a projector the light from a suitable source is projected through the film as it passes the opening 11 in the film gate and thence through the lenses 12 to the projection screen. The lens 12 is mounted in a cylinder 13 which slides along the optical axis in an outer cylinder 14. The mechanism for adjusting the cylinder 13 comprises a yoke 64 having depending rods or pins 24 sliding in lugs 25 fast to the cylinder 13 (Fig. 1) and sliding horizontally on pins 15 (Figs. 1 and 4). Fast in an opening in the center of yoke 64 is a tube 16 which slides over a stud 17 non-rotatably fastened to the frame by a screw 18. The stud 17 has a slot 20 to accommodate the block 21 fastened in the tube 16 by screws 22. A screw adjuster 23 is threaded into an axial bore in the outer end of the stud 17 and bears against the block 21 which, together with the tube 16 and yoke 64, is held outwardly against the end of the screw 23 by the springs 24 surrounding pins 15 (Fig. 4). Thus by threading the screw 23 inwardly the lens 12 is moved toward the film and by threading the screw outwardly the springs 24 move the lens away from the film. By virtue of the sliding interconnection between yoke 64 and the lens cylinder 13, the lens cylinder may reciprocate vertically (the lugs 25 sliding up and down on the pins 24); and the lens cylinder may be adjusted along the optical axis in any position along its reciprocatory path or indeed while it is reciprocating back and forth.

The outer lens cylinder 14 is mounted for vertical reciprocation in the guides 26 (Fig. 1); and a pin 27, fast to the cylinder 14, extends upwardly therefrom through a suitable guide (Fig. 2) in which is mounted a spring 28 which bears upwardly against a collar 29 fast on the pin, thereby partially or wholly to support the weight of the reciprocatory parts. Depending from the lens cylinder 14 is an arm 30 carrying on its lower end two cam followers 31 and 32, each comprising inner rings fast to the pin 33 and outer rings rolling on the inner rings through ball bearings. The cam for vertically reciprocating the lens through the medium of the aforesaid cam followers is shown at 34 and is fast on the shaft 7. As shown in Fig. 5 this cam has inner and outer cam surfaces 35 and 36 engaging the followers 31 and 32 respectively, the surfaces being shaped to move the lens downwardly at approximately the speed of the film, throughout the 270° arc indicated at 38 in Fig. 5, and then quickly to return the lens to uppermost position throughout the remaining 90° arc designated at 39 in Fig. 5.

By employing inner and outer cam surfaces bearing against separate cam followers as shown in the drawings substantially all lost motion between the cam and the followers is eliminated. The preferred method of cutting the groove in the cam is first to mill a groove whose width at the bottom is equal to the diameter of the smaller cam follower 31 and whose width at the top is equal to the diameter of the larger cam follower 32, and subsequently to cut away the outer face of the bottom of the groove to provide clearance as shown at 40 in Fig. 2 and also to cut away the inner wall of the outer portion of the groove as shown at 41 in Fig. 2, so that the follower 31 engages only the inner face 35 and the follower 32 only the outer face 36.

The shaft 7 carrying the cam 34 and other rotary parts is journalled in dove-tail guides 42 and 43 which slide in the frame transversely of the axis of the shaft and transversely of the path of reciprocation of the lens. 12. For the purpose of adjusting the guide in the frame a lug 44 is provided on the guide 43 and a screw 45 threaded in the frame at 46 (Fig. 3) is journalled in the lug 44 so that as the screw is threaded in or out of the frame the cam is adjusted in a direction perpendicular to the plane 2—2 of Fig. 1. With the parts in the position shown in Figs. 1, 2 and 3 the axis of the cam is in the aforesaid plane and the vertical throw of the reciprocatory lens is a minimum. As the cam is moved off center the throw is increased as indicated in Fig. 6 where 47 indicates the throw in dead center position and 48 the throw off dead center position. Obviously the more the cam is moved from dead center position the greater the throw and the speed of reciprocation.

The principal purpose for this cam adjustment is to adjust the rate of lens travel to different distances between the lenses and the screen or scene. Owing to the spacing between the film and the lens the lens must move somewhat slower than the film and as the projector is moved nearer the screen the difference in rate of movement between the lens and the film must be decreased. Thus by adjusting the screw 45 the rate of movement of the lens relative to the film may be varied at will to accommodate any position of the apparatus relative to the screen. Moreover, variation in the film length due to shrinkage or expansion may readily be compensated for by the same adjusting mechanism.

While adjustment of the cam off center lowers both the upper and lower limits of reciprocation this downward shift of the lens path may readily be compensated for by a correspondig shift of the usual framing mechanism, particularly since the picture window 50 (Fig. 2) is carried by the lens cylinder 14.

The shutter 60 may be mounted on the pulley 8 by pins 61 to intercept the light while the lens is moving upwardly to pick up the next succeeding picture, the opening in the shutter having a radial dimension great enough to pass the picture beam during substantially all of the downward movement of the lens in any position of adjustment of the cam.

I claim:

1. Cinematographic apparatus comprising means for feeding a film continuously across an optical axis, a lens reciprocating back and forth along a path extending transversely of said axis, a cam follower connected to said lens, a rotating cam engaging said follower for reciprocating the lens, and means for adjustably varying the relative position of the cam and follower transversely of the cam axis and transversely of said path to vary the throw of the lens.

2. Cinematographic apparatus comprising means for feeding a film continuously across an optical axis, a lens reciprocating back and forth along a path extending transversely of said axis, a cam follower connected to said lens, a rotating cam engaging said follower for reciprocating the lens, and means for adjusting the cam transversely of its axis and transversely of said path to vary the throw of the lens, the axis of the cam substantially intersecting a continuation of the lens path in one position of adjustment.

3. Cinematographic apparatus comprising means for feeding a film continuously along a predetermined path, a lens reciprocating along a line parallel to said path, a cam follower connected with the lens, a cam engaging the follower and rotatable about an axis disposed in a plane perpendicular to said line, means for adjusting said cam transversely of both said line and axis from a position wherein said axis intersects said line to an off-center position, and a shutter fast to said cam, the shutter having an opening in line with said lens in any position of adjustment.

4. Cinematographic apparatus comprising means for feeding a film continuously along a predetermined path, a lens reciprocating along a line parallel to said path, a cam follower connected with the lens, a cam engaging the follower and rotatable about an axis disposed in a plane perpendicular to said line, and means for adjusting said cam transversely of both said line and axis from a position wherein said axis intersects said line to an off-center position.

5. Cinematographic apparatus comprising means for feeding a film continuously along a predetermined path, a lens reciprocating along a line parallel to said path, a cam follower connected with the lens, a cam engaging the follower and rotatable about an axis disposed in a plane perpendicular to said line, and means for adjusting said cam transversely of both said line and axis from a position wherein said axis intersects said line to an off-center position, said cam having inner and outer bearing surfaces and said follower having two rollers bearing only on said surfaces respectively.

Signed by me at Boston, Massachusetts, this 28th day of May, 1928.

CLARENCE B. HALL.